United States Patent
Yokoi et al.

(10) Patent No.: US 6,291,380 B1
(45) Date of Patent: Sep. 18, 2001

(54) DIELECTRIC CERAMIC AND CAPACITOR USING THE SAME

(75) Inventors: Hiroki Yokoi; Takeshi Sawano; Takashi Hashiguchi, all of Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/526,281

(22) Filed: Mar. 15, 2000

(30) Foreign Application Priority Data

Mar. 15, 1999 (JP) .................................. 11-068415
Apr. 12, 1999 (JP) .................................. 11-104591

(51) Int. Cl.⁷ .................................. C04B 35/468
(52) U.S. Cl. .................. 501/138; 501/139; 361/321.4
(58) Field of Search .................... 501/138, 139; 361/321.4

(56) References Cited

U.S. PATENT DOCUMENTS

| | | | |
|---|---|---|---|
| 3,920,781 | 11/1975 | Eror et al. | |
| 5,453,409 | * 9/1995 | Kishi et al. | 501/139 |
| 6,058,005 | * 5/2000 | Matoba et al. | 501/139 |
| 6,195,250 | * 2/2001 | Matoba et al. | 501/139 |

FOREIGN PATENT DOCUMENTS

| | | |
|---|---|---|
| 57-42588 | 9/1982 | (JP) . |
| 3-133116 | 6/1991 | (JP) . |
| 4-367559 | 12/1992 | (JP) . |
| 5-217793 | 8/1993 | (JP) . |
| 5-217794 | 8/1993 | (JP) . |
| 5-217798 | 8/1993 | (JP) . |
| 6-45182 | 2/1994 | (JP) . |
| 6-69064 | 3/1994 | (JP) . |
| 6-69065 | 3/1994 | (JP) . |
| 6-275459 | 9/1994 | (JP) . |
| 2521855 | 5/1996 | (JP) . |
| 2521856 | 5/1996 | (JP) . |
| 2521857 | 5/1996 | (JP) . |
| 200005837 | * 2/2000 | (JP) . |

* cited by examiner

*Primary Examiner*—Karl Group
(74) *Attorney, Agent, or Firm*—Armstrong, Westerman, Hattori, McLeland & Naughton, LLP

(57) ABSTRACT

A dielectric material comprising: a main component represented by the composition formula $(1-\alpha)\{(Ba_{1-x}Ca_xO)_A(Ti_{1-y}Zr_yO_2)_B\} \cdot \alpha L_2O_3$, wherein $0.0005 \leq \alpha \leq 0.015$, $0.03 \leq x \leq 0.15$, $0.01 \leq y \leq 0.25$, $1.00 \leq A/B \leq 1.02$, L: at least one component selected from the group consisting of lanthanide; and subsidiary components including 0.01 to 1.0% by weight of MnO and 0.005 to 0.5% by weight of an oxide containing $Al_2O_3$ as a major component; and further 0.01 to 0.4 total % by weight of at least one oxide selected from the group of oxides of V, Nb, Ta, Mo and W, and a small size, large capacitance, multi-layer ceramic chip capacitor comprising said dielectric material.

8 Claims, No Drawings

DIELECTRIC CERAMIC AND CAPACITOR USING THE SAME

FIELD OF THE INVENTION

The present invention relates to a ceramic dielectric material and a multi-layer ceramic capacitor, which is applied to such as electronic circuits, using the same.

BACKGROUND OF THE INVENTION

A multi-layer ceramic chip capacitor using ceramics as dielectric materials, which is mainly composed of the titanate such as barium titanate $BaTiO_3$, having BaO to $TiO_2$ mol ratio of 1, has become an essential component applied to current industrial and household electronics appliances due to its high-capacity in small size, fine high-frequency characteristics, i.e., electrical characteristics in high-frequency, excellent heat-resistance and adaptability for mass-production.

Since pure $BaTiO_3$ is not exactly sufficient in dielectric constant under room temperature and dielectric characteristics such as thermal variation, the composition is typically modified by substituting Ca and/or Sr for a part of Ba, and Zr for Ti. With such a substitution, Curie temperature, i.e. transformation temperature of the crystal system at which the dielectric constant is exponentially improved, is shifted near to room temperature to improve its dielectric constant so that performance as a capacitor can be enhanced, in conjunction with its increased electrical resistance.

While there exists a single plate capacitor having each of the electrodes mounted on both sides of a platy dielectric material, a multi-layer capacitor is aboundingly fabricated, in which dielectric materials are thinned and then the materials and counter electrodes are alternately laminated to enlarge an effective electrode area. Such a multi-layer ceramic chip capacitor is fabricated in a process comprising steps of: first printing or applying a paste, which is composed of conductive metal powder to be served as an internal electrode, on a green ceramic sheet thinned, then laminating a number of such sheets and sintering to integrate them, and mounting an external electrode, which is connected with the internal electrode, outside the integrated body.

For making a dielectric constant of ceramics adequately high, it is generally required to sinter ceramics at a high temperature of approximate 1300 degrees centigrade (° C.) When a part of oxygen in the ceramics is dispersed during this treatment, the dielectric material would become semi-conducting material to result in lower insulation performance, which is insufficient for a capacitor. Thus the sintering is usually carried out under oxidizing atmosphere including oxygen.

When a melting point of the internal electrode is relatively low, there is the possibility to melt and run out during sintering. Therefore, it is required for the internal electrode to be composed of a metal, whose melting point is higher than the sintering temperature for the ceramics, being able to be sintered at the same temperature as that of the ceramics and being not oxidized under an oxidizing atmosphere at such temperature. Pt, Pd and alloy of them have conventionally been applied as a metal for the internal electrode meeting this requirement. The more the number of laminated layers is increased with thinning of the thickness of a ceramic layer, the more the weight ratio of these materials to the entire capacitor weight is increased. In this case, the cost of the capacitor is considerably increased due to the expensive cost of these materials. Therefore, in view of small specific resistivity, high melting point and low cost, Ni and Ni alloy are applied as the electrode material.

At high sintering temperature under oxidizing atmosphere, Ni is oxidized to annul functions in the electrode and further it runs into the ceramics in the form of oxide to lose its performance as a capacitor. In the sintering atmosphere, when its oxygen partial pressure is lowered or hydrogen is included thereinto, in order to prevent oxidization of Ni, there causes a problem that the ceramics would be deoxidized to be turned to semi-conducting material. Thus, a continuing development and practical application have been carried on for getting at ceramics having adequate deoxidization resistance, with which the ceramics is not turned to semi-conducting material and its insulation resistivity is not decreased even if it is sintered under the reducing atmosphere or the atmosphere with low oxygen partial pressure, and also satisfactory characteristics for the dielectric material.

U.S. Pat. No. 3,920,781 discloses an invention in which the mol ratio of barium titanate ceramics between a large radius cation (divalent ion such as Ba and Ca) and a small radius cation (quadrivalence ion such as Ti and Zr) is adapted to be above 0.95 but no more than 1.0. This invention describes that in cases where base metal, such as Ni, is applied to an electrode and sintering at 1000 to 1400° C. is conducted under an atmosphere with low oxygen partial pressure, an equal or better electric characteristic can be obtained as compared with that of a capacitor in which a platinum electrode sintered in the air is applied.

Thereafter, as an invention disclosed in Japanese Patent Publication No. 57-42588, it was shown that a mol ratio of BaO group oxides substituting Ca or Sr for a part of Ba and having a large radius cation to $TiO_2$ having a small radius cation is adapted to be 1.005 to 1.030 or more than 1 so that reduction resistant ceramics can be obtained. Nowadays, a ceramic dielectric material having deoxidization resistance with such mol ratio is commonly applied to an electrode using base metal such as Ni.

Though the aforementioned improvement for a ceramic dielectric material has enabled base metal, such as Ni, to be applied to the internal electrode, there has remained problems of less stability in characteristics and lower reliability as compared with that of a multi-layer capacitor in which Pd or the like is applied to the electrode.

In relation to the above problem, various improvements have been proposed not only for enhancement of reliability but also for enhancement of performance and further lowering of sintering temperature. For example, Japanese Patent Laid-Open Publication No. 3-133116 discloses a multi-layer ceramic chip capacitor comprising: a dielectric material composed of ceramics, in which a mol ratio between an oxide substituting Ca or Sr for a part of Ba and an oxide substituting Zr for a part of Ti is adapted to be 1.00 to 1.020 and also 0.005 to 0.5% by weight of at least one component selected from the group consisting of oxides of Y, Gd, Tb, Dy, Zr, V, Mo, Zn, Cd, Tl, Sn and P is added, and an internal electrode composed of Ni or Ni alloy. This invention describes that in the case where oxides of Y and such is added, insulation resistivity life is improved to a large extent as compared with the case without such additive. As a similar improvement, Japanese Patent Laid-Open Publication No. 4-367559 discloses a ceramics dielectric material having deoxidization resistance, in which each of Mn or Cr oxide, Si oxide and Y oxide is added respectively with 0.005 to 1.0% by weight to a composition having slightly over 1.0 mol ratio of BaO group oxides to $TiO_2$ group oxides. Further, Japanese Patent Laid-Open Publication No. 6-45182 and Japanese Patent Laid-Open Publication No. 6-275459 disclose inventions for extending the life by adding V or W oxide, $SiO_2$, $Al_2O_3$ and so on in addition to oxides of Y and Mn.

Japanese Patent No. 2521855, Japanese Patent No. 2521856 and Japanese Patent No. 2521857 disclose inventions for a multi-layer ceramic chip capacitor consisting of a main component in which a mol ratio of BaO group oxides substituting Ca and Mg for a part of Ba is slightly larger than a mol ratio of $TiO_2$ group oxide partially substituting Zr, to which 0.002 to 0.04 mol of oxides of rare earth elements are added, and subsidiary components of 0.2 to 5% by weight composed of compositions with low melting point, such as $Li_2O$—$SiO_2$-alkaline earth metal oxide and $B_2O_3$—$SiO_2$-alkaline earth metal oxide.

Furthermore, Japanese Patent Laid-Open Publication No. 5-217793, Japanese Patent Laid-Open Publication No. 5-217794 and Japanese Patent Laid-Open Publication No. 5-217798 disclose an invention including the same effect as described above, in which Ca is applied as a substitute for a part of Ba. In the approximately same composition, an invention for a capacitor having a dielectric material, wherein Sr is added in addition to Ca and Mg as substitute elements for a part of Ba, is disclosed in Japanese Patent Laid-Open Publication No. 6-69065.

As above, to enable a low cost base metal to be applied to an internal electrode of a ceramic capacitor, a great deal of research and development has been carried out to establish a ceramic dielectric material having high dielectric constant and being capable of avoiding deterioration of its characteristics even in cases where sintering for its integration is conducted under reducing atmosphere and further at lower temperature. However, in a multi-layer ceramic chip capacitor, strong demand for large capacity with small size, enhancement of performance and reliability and also reduction of manufacturing costs continuously remain.

SUMMARY OF THE INVENTION

One object of the present invention is to provide a reliable ceramic dielectric material having the following (1) through (4) characteristics.

(1) Dielectric constant is high and dielectric loss factor (tanδ) is small.

(2) Breakdown voltage is high so that thickness of the dielectric is able to thin.

(3) Capacitance change in high temperature life test is small.

(4) The aforementioned characteristics have no deterioration even when the ceramics are sintered to integrate with an internal electrode composed of Ni or Ni alloy.

Another object of the present invention is to provide a small size, large capacity, multi-layer ceramic chip capacitor comprising the aforementioned ceramic dielectric material and an internal electrode composed of Ni or Ni alloy.

The ceramic dielectric material of the present invention comprises a main component represented by the following composition formula (a) and a subsidiary component including 0.01 to 1.0% by weight of MnO, and 0.005 to 0.5% by weight of an oxide mainly containing $Al_2O_3$.

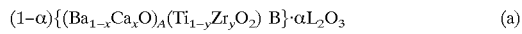

$(1-\alpha)\{(Ba_{1-x}Ca_xO)_A(Ti_{1-y}Zr_yO_2) B\} \cdot \alpha L_2O_3$ (a)

Wherein
$0.0005 \leq \alpha \leq 0.015$
$0.03 \leq x \leq 0.15$
$0.01 \leq y \leq 0.25$
$1.00 \leq A/B \leq 1.02$ L: at least one element of lanthanide.

The oxide shown as $L_2O_3$ in the aforementioned composition formula (a) is preferably an oxide of Ho or an oxide of lanthanide mainly containing Ho.

The dielectric material according to the present invention may further include 0.01 to 0.4 total % by weight of at least one component selected from the group consisting of V oxides, Nb oxides, Ta oxides, Mo oxides and W oxides as a subsidiary component. In this case, it is preferable to include with combining equal to or more than 0.01% by weight of at least one oxide selected from the group consisting of V oxides, Nb oxides and Ta oxides, and equal to or more than 0.01% by weight of Mo oxides and/or W oxides.

The capacitor according to the present invention is obtained by laminating a ceramic dielectric material and an internal electrode composed of Ni or alloy mainly containing Ni and then simultaneously sintering them. In this multi-layer ceramic capacitor, a thickness of a ceramic dielectric material layer between opposed internal electrodes is preferably equal to or less than 7 μm.

DETAILED DESCRIPTION OF THE PREFERRED EMBODIMENTS

The present invention has been obtained on the basis of an objective to develop a ceramic chip capacitor, in which Ni or Ni alloy is applied as an internal electrode, having high dielectric constant, small dielectric loss factor and sufficiently sustainable reliability against a hard environment. The reliability is measured in the respect that breakdown voltage is high so that thickness of the dielectric material layer between opposed electrodes can be thinner (that is breakdown voltage can be kept high even when the thickness of the dielectric material layer between opposed electrodes is thinner), and capacitance change rate is small in high temperature life test.

First, reduction resistant ceramics are necessary for using the internal electrode made of base metals such as Ni. As reported hitherto, to be satisfied with the above requirement, it is necessary that a mol ratio of BaO group oxides, as a main component, substituting Ca for a part of Ba to $TiO_2$ group oxides substituting Zr for a part of Ti, is equal to or slightly more than 1. That is, a ratio between each existing number of divalent and quadrivalent cation in the main component should be equal to or slightly more than 1. This results from the fact that Ca becomes a divalent cation the same as Ba, while Zr becomes a quadrivalent cation the same as Ti.

For improving dielectric constant, it is effective to quantitatively substitute Ca for a part of Ba and also Zr for a part of Ti respectively. This is supposedly caused from the effect to make Curie temperature lower and also improve temperature dependency of the dielectric constant.

As described above, it has been proposed to add various elements in the form of oxide to this main component for improving its performance as a dielectric material. The inventors of the present invention aimed specifically at the addition of oxide of rare earth elements, such as Y, and then investigated the effect of its addition. As a result, it was confirmed that Y has the effect that had already been reported. Further it was found that lanthanide elements, also have an effect to improve the dielectric material performance equal to or more than that of Y when they are separately included.

Any of the aforementioned elements is equally effective in improving deoxidization resistance. However, with respect to dielectric constant, dielectric loss factor, breakdown voltage, insulation resistance and capacitance change in high temperature life test, each element has a slightly different effect. The effect to each performance can sufficiently be obtained even when plural elements are added collectively. It was confirmed that including Ho particularly shows remarkable effects not only in improvement of dielectric constant but also in increase of breakdown voltage and deterrence of performance deterioration in high temperature life test.

Though lanthanide oxide has the effect described above, it deteriorates sintering behavior of ceramics, results in defects of their density and mechanical strength after sintering. Thereat, with simultaneously adding lanthanide oxide and MnO or $SiO_2$, characteristics of ceramics after sintering were examined. As a result, it was confirmed that MnO had an effect in improvement of sintering behavior and insulation resistance. At the same time, it was found that $SiO_2$ considerably improved sintering behavior, but deteriorated the characteristics after high temperature life test and also facilitates grain growth of ceramic. As the result of an investigation of oxide, which is effective to add with MnO for an alternative to $SiO_2$, it was found that an oxide containing $Al_2O_3$ as a major component was suitable to add. The oxide containing $Al_2O_3$ as the major component is excepting $SiO_2$ and can be selected from the group consisting of equal to or more than 50% by weight of $Al_2O_3$ additionally containing MgO, CaO, BaO and such. The oxide may consist substantially of 100% of $Al_2O_3$. With the addition of the oxide containing $Al_2O_3$ as the major component, sintering behavior is improved and also grain growth of ceramic is restrained. Besides, capacitance change in high temperature life test becomes small compared with the case where $SiO_2$ is included.

As above, with applying the aforementioned sintering auxiliaries as a subsidiary component in parallel with adding the lanthanide oxide to the main component, various characteristics including dielectric constant, dielectric loss factor and resistance to reduction are significantly improved. Further it provides an advance in sintering degree in addition to low capacity change rate in high temperature life test.

The aforementioned effect in deterring the capacity change rate can further be enhanced when including an oxide of 5a or 6a group element, such as $V_2O_5$, $Nb_2O_5$, $Ta_2O_5$, $MoO_3$ and $WO_3$, in addition to the various components. The reason is not clear why deterioration of the capacity change rate in high temperature life test can be deterred with adding these oxides. However it can be assumed that, since the free-energy change of the oxides of such elements is slightly smaller in comparison with that of $TiO_2$ making up the ceramic dielectric material, these oxides contributes to the stabilization of the dielectric material with acting as a source of oxygen.

Thereat the effect in inclusion of these 5a or 6a group elements was examined in detail. As a result, it became clear that, when an oxide of 5a group element and an oxide of 6a group element were included with combining, the capacity change rate in high temperature life test was particularly reduced to a large degree. The reason is unclear why the addition with combining these oxides results in such an increased effect on this particular occasion, but it is assumed that the effect is caused by some action of an eutectic composite resulting from the addition.

Through further examination for clarifying the bounds to obtain such excellent characteristics with respect to the compositions of the dielectric material described above, the present invention has been completed.

According to the present invention, a main component of a ceramic dielectric material is $BaTiO_3$ (or $BaO \cdot TiO_2$) having perovskite crystal structure. In the composition formula (a), Ca is applied as a substituent for a part of Ba, and Zr is also applied as a substituent for a part of Ti. Calcium of 0.03 to 0.15% by atomic percentage is applied as a substituent for Ba, that is, in the aforementioned composition formula (a), Ca in the amount of $0.03 \leq x \leq 0.15$ is applied as a substituent for Ba. Zirconium of 0.01 to 0.25% by atomic percentage is applied as a substituent for Ti, that is, in the aforementioned composition formula, Zr in the amount of $0.01 \leq y \leq 0.25$ is applied as a substituent for Ti.

These subustituents enable Curie temperature to be lower near to room temperature and, at the same time, enable a thermal change rate of the dielectric constant to be small so that the dielectric constant approximately at room temperature can be high and also steady. In addition, these are effective for deterring the lowering of the insulation resistance when sintering under non-oxidizing atmosphere. However, in both cases where x is less than 0.03 and y is less than 0.01, these effects will not be sufficiently achieved. Further, in both cases where x is greater than 0.15 and y is greater than 0.25, aside from deterioration of the dielectric constant, sintering will be enmeshed itself in difficulties so that compact ceramics will not be able to be obtained.

The mol ratio between $(Ba_{1-x}Ca_xO)$ and $(Ti_{1-y}Zr_yO_2)_B$ in the main component, that is the ratio between A and B in the aforementioned composition formula (a), must be in the range of $1.00 \leq A/B \leq 1.02$. This is led by reason that, when A/B is less than 1.00 in the case where sintering is conducted under the atmosphere in low oxygen partial pressure for deterring oxidization of such as Ni, reduced ceramics having decreased insulation resistance will be obtained. When A/B is greater than 1.02, the dielectric constant will be deteriorated and compact ceramics will not be able to be obtained.

In the main component, 0.0005 to 0.015 mol ratio of $L_2O_3$ type lanthanide oxide is included where A+B=1 in perovskite crystal structure of the aforementioned $(Ba_{1-x}Ca_xO)_A$ and $(Ti_{1-y}Zr_yO_2)_B$. That is, in the aforementioned composition formula (a), the value of α is $0.0005 \leq \alpha \leq 0.015$. When such lanthanide oxide is included, the dielectric constant is improved and dielectric loss factor (tanδ) is reduced. In addition, the resistance to reduction and high temperature load-life are improved. Further, this is effective for refining ceramic particle. It needs at least equal to or more than 0.0005 by mol ratio to obtain these effects. However, when the mol ratio is greater than 0.015, the sintering will be inefficient so that the electric characteristics will be deteriorated.

In lanthanide of atomic number 57 to 71 of the periodic table, any one of them or any mixture composed of more than two of them is effective. Particularly, with respect to the capacitance change rate in high temperature life test, where each content ratio of the lanthanide is kept in the same value, as the atomic number of lanthanide is increased from 57, the change rate becomes smaller and is finally minimized at Ho of atomic number 67. Thus, it is preferable that the $L_2O_3$ consists singly of Ho oxide, or is composed of oxide of lanthanide mixture that consists of not less than 50 atomic % of Ho and the rest of other lanthanide elements.

A subsidiary component is included as auxiliaries and additives. The content of each composition in the following subsidiary component shows a ratio with respect to the total weight adding the main component and the subsidiary component. Manganese oxide of 0.01 to 1.0% by weight is included as sintering auxiliaries. While addition of lanthanide oxide deteriorates sintering behavior, MnO is effective for compensating this defect. Since MnO has a function to facilitate sintering, a compact sintered material can be formed even under low sintering temperature so that it may be effective to assure the insulation resistance and to increase the breakdown voltage of the dielectric material. Thus, when the thickness of the dielectric material is thinned and then the number of the laminating layers is increased to enhance capacitance of the capacitor, the addition of MnO is effective to improve reliability of the capacitor. To bring out such effects, the content of MnO is needed to be equal to or more than 0.01% by weight. Since excess of its inclusion results in deterioration of the dielectric constant and reduction of the mechanical strength, the content of MnO should be no more than 1.0% by weight. Preferably, the content of MnO is in the range of 0.01 to 0.5% by weight. When including at least one component selected from the group consisting of V oxide, Nb oxide, Ta oxide, Mo oxide and W oxide, the content of MnO is preferably in the range of 0.05 to 1.0% by weight.

For the sintering auxiliaries, an oxide of equal to or less than 0.5% by weight containing $Al_2O_3$ as a major component is included as well as MnO. This oxide includes $Al_2O_3$ of at least equal to or more than 50% by weight with respect to the total weight of this oxide. In the rest component other than $Al_2O_3$, oxides having relatively low melting point, such as $SiO_2$, $LiO_2$ and $B_2O_3$, are undesirable because their application results in coarse ceramic grain. Therefore, excepting such oxides, it is desirable to apply oxides of alkali earth metal, such as MgO, CaO and BaO, as the rest component. This oxide may substantially be composed of $Al_2O_3$ of 100% by weight with respect to the total weight of this oxide. With including $Al_2O_3$ as the sintering auxiliaries, it is deterred to grow into the coarse ceramic grain so that a compact dielectric material layer with fine grain can be obtained. In this oxide containing $Al_2O_3$ as a major component, since excess of its inclusion causes the coarse ceramic grain, the content of this oxide should be no more than 0.5% by weight. However, the content is preferably at least 0.005% by weight to manifest the effect of its addition.

In the subsidiary component, 0.01 to 0.4 total % by weight of at least one component selected from the group consisting of oxides of V, Nb, Ta, Mo and W is preferably included. This is effective to reduce the capacitance change rate in high temperature life test. The effect is insufficient when the content of the oxide is less than 0.01% by weight, while the content of equal to or more than 0.01% by weight results in the remarkable effect. In such a case, any one component selected from the group consisting of oxides of these elements is effective and further any two components may be included with combining. Particularly, where more than two components are included, when at least 0.01% by weight of at least one component selected from the group consisting of oxides of Nb and Ta in 5$a$ group elements and at least 0.01% by weight of one or two components selected from the group consisting of oxides of Mo and W in 6$a$ group elements are simultaneously included, the effect can be further enhanced.

However, when the total content of these oxides is more than 0.4% by weight, the capacitance change rate cannot be further improved and additionally deterioration of the insulation resistance will be increased. Thus the total content of these oxides is preferably not more than 0.4% by weight.

When a capacitor is provided with use of the dielectric material according to the present invention, Ni or Ni alloy is preferably applied to the internal electrode. However, Co, Fe, and alloy of their mixture can also be utilized.

As a method for manufacturing the multi-layer ceramic chip capacitor according to the present invention, a conventional manufacturing method for the multi-layer capacitor, in which Ni or Ni alloy is applied for the internal electrode, can be applied. For example, oxides of Ba, Ca, Ti and Zr to be main components or compound which is formed into these oxides by sintering, such as raw materials of these elements, e.g. carbonate and nitrate, are mixed to set up a specific composition. The mixture is then calcined approximately at 1000 to 1200° C. approximately for 1 to 5 hours and the resulting product is milled. Mn and Al, which are subsidiary components to be sintering auxiliaries and, where necessary, oxides of V, Nb, Ta, Mo and/or W, and raw materials such as carbonate or nitrate, are mixed with this powder of the main components. With respect to lanthanide, which is one of the main components, the oxide or a raw material of which is formed into the lanthanide oxide, may be added in a required amount with the subsidiary components.

In the main components, since the particle size of the milled powder after the calcination process has an influence on the grain size of ceramic after sintering, the average diameter of the milled particle is preferably equal to or less than 1 $\mu$m. Powders of subsidiary components and the raw material of lanthanide are mixed with the powder of the main components with adding a binder material. After milling the mixed powder, green sheets are formed to obtain a requested thickness after sintering. These green sheets are laminated with adhering an electrode material on the green sheets by printing or the like. After forming into a required shape, the multi-layer ceramic chip capacitor is manufactured through processes comprising: preliminary heat treatment for burning off the binder, sintering at high temperature of 1100 to 1300° C., re-oxidizing treatment, attaching of terminals for connecting to external circuits, and additional processes.

EXAMPLE

Example 1

In the oxide represented by the composition formula of $(1-\alpha)$ $\{(Ba_{1-x}Ca_xO)_A(Ti_{1-y}Zr_yO_2)_B\} \cdot \alpha L_2O_3$, which is the main component of the dielectric material, $\alpha=0.003$, $x=0.05$, $y=0.2$, and $A/B=1.005$ (where $A+B=1$) were selected and also Ho was selected as L (lanthanide). Green sheets were fabricated, which were formed to obtain thickness of 5 $\mu$m after sintering. Subjecting to constant 0.2% by weight of MnO as a subsidiary component, the content of $Al_2O_3$ or $SiO_2$ was varied according to values shown in table 1.

In this case, $BaCO_3$, $CaCO_3$, $TiO_2$ and $ZrO_2$ were applied as raw materials for main components. These materials were mixed to obtain the aforementioned composition after sintering. After calcining the mixture at 1100° C. for 2 hours, the resulting product was milled and sized to obtain an average particle diameter of less than 1.0 $\mu$m. A powder of $Ho_2O_3$ was combined with the resulting product, and the amount of $Al_2O_3$ or $SiO_2$ shown in table 1 and $MnCO_3$ to be converted into MnO of 0.2% by weight were applied, as raw materials of the subsidiary component. After adding a particular amount of binder, this mixed powder was milled for 24 hours by a ball-mill. The resulting product was formed into green sheets by way of the doctor blade method.

A conductive paste to be a Ni electrode was printed by screen process printing in a particular pattern. The printed sheet was laminated and then the laminated product was cut off to fabricate a green chip for a capacitor having 1.25 mm width and 2.0 mm length and also having 10 electrodes. After this green chip was heated under nitrogen atmosphere at 500° C. for 3 hours in order to burn off the binder, the resulting product was sintered in nitrogen atmosphere containing 3% of hydrogen humidified with 30° C. of water, at 1300° C. for 2 hours. Further re-oxidizing treatment was applied to the resulting product in nitrogen atmosphere humidified with 30° C. of water, at 1100° C. for 2 hours. Then Cu terminals were mounted on an edge portion of the resulting product by firing at 900° C. to fabricate a multi-layer ceramic chip capacitor.

With respect to these capacitors, average ceramic grain size, relative dielectric constant $\in_s$ at 25° C., dielectric loss factor tan$\delta$ and breakdown voltage were measured. The results are shown in table 2.

As apparent from the results shown in table 2, when the composition of the main component is in the range according to the present invention and the content of $Al_2O_3$ is varied subjecting to constant content of MnO, small tan$\delta$ and high dielectric constant were obtained. It can be presumed that this is caused from adequate of $Al_2O_3$ resulting in the ceramic grain size controlled within the suitable range. However, as sample number 106, when content of $Al_2O_3$ is increased up to 1.0% by weight, the grain size becomes large and also the breakdown voltage goes down. As sample number 107 and 108, when $SiO_2$ is included, the tan$\delta$ is large and the breakdown voltage is low.

TABLE 1

| Test No. | L₂O₃ Compound Species | α | MnO | Al₂O₃ | SiO₂ | Remarks |
|---|---|---|---|---|---|---|
| 101 | Ho₂O₃ | 0.003 | 0.20 | 0 | 0 | Comparative Example |
| 102 | Ho₂O₃ | 0.003 | 0.20 | 0.05 | 0 | Comparative Example |
| 103 | Ho₂O₃ | 0.003 | 0.20 | 0.10 | 0 | Comparative Example |
| 104 | Ho₂O₃ | 0.003 | 0.20 | 0.20 | 0 | Comparative Example |
| 105 | Ho₂O₃ | 0.003 | 0.20 | 0.50 | 0 | Comparative Example |
| 106 | Ho₂O₃ | 0.003 | 0.20 | 1.00 | 0 | Comparative |
| 107 | Ho₂O₃ | 0.003 | 0.20 | 0 | 0.05 | " |
| 108 | Ho₂O₃ | 0.003 | 0.20 | 0 | 0.10 | " |

TABLE 2

| Test No. | Average Grain size (μm) | Ceramic Thickness (μm) | Dielectric Loss Factor tan δ (%) | Relative Dielectric Constant εs | Breakdown Voltage (V) | Remarks |
|---|---|---|---|---|---|---|
| 101 | 1.3 | 5.4 | 2.28 | 8,000 | 200 | Comparative Example |
| 102 | 1.6 | 5.3 | 2.79 | 11,700 | 220 | Example |
| 103 | 2.0 | 5.2 | 3.13 | 14,100 | 230 | Comparative Example |
| 104 | 2.6 | 5.4 | 3.78 | 13,300 | 230 | Comparative Example |
| 105 | 3.0 | 5.4 | 4.44 | 14,200 | 210 | Comparative Example |
| 106 | 4.5 | 5.4 | 6.19 | 13,900 | 80 | Comparative |
| 107 | 4.2 | 5.3 | 5.71 | 13,800 | 60 | " |
| 108 | 4.8 | 5.4 | 6.09 | 14,000 | 30 | " |

Example 2

As the subsidiary component, 0.2% by weight of MnO and 0.10% by weight of Al₂O₃ set up in constant respectively. Then, with respect to L (lanthanide) shown in example 1 as the main component, the element was varied as shown in table 3 wherein mol ratio α of the content was maintained in the same value. Subjecting to the above-mentioned condition, a multi-layer ceramic chip capacitor was fabricated by the same process as example 1. With respect to these capacitors, the measured results of relative dielectric constant $\epsilon_s$ at 25° C. dielectric loss factor tanδ, breakdown voltage and insulation resistance are shown in table 4. After the high temperature life test applying 100 V of DC voltage for 1000 hours at 85° C., relative dielectric constant at 25° C., dielectric loss factor tanδ, insulation resistance and capacitance change rate before and after the test were determined. The results are shown in table 4 also.

TABLE 3

| Test No. | L₂O₃ Compound Species | α | Sub Component (weight %) MnO | Al₂O₃ | Remarks |
|---|---|---|---|---|---|
| 201 | Y₂O₃ | 0.003 | 0.20 | 0.10 | Comparative Example |
| 202 | La₂O₃ | 0.003 | 0.20 | 0.10 | " |
| 203 | Pr₂O₃ | 0.003 | 0.20 | 0.10 | " |
| 204 | Sm₂O₃ | 0.003 | 0.20 | 0.10 | " |
| 205 | Gd₂O₃ | 0.003 | 0.20 | 0.10 | " |
| 206 | Dy₂O₃ | 0.003 | 0.20 | 0.10 | " |
| 207 | Ho₂O₃ | 0.003 | 0.20 | 0.10 | " |

TABLE 3-continued

| Test No. | L₂O₃ Compound Species | α | Sub Component (weight %) MnO | Al₂O₃ | Remarks |
|---|---|---|---|---|---|
| 208 | Tm₂O₃ | 0.003 | 0.20 | 0.10 | " |
| 209 | Lu₂O₃ | 0.003 | 0.20 | 0.10 | " |

TABLE 4

| Test No. | Ceramic Thickness (μm) | Dielectric Loss tan δ (%) | Relative Dielectric Constant εs | Insulation Resistance (GΩ) | Breakdown Voltage (V) | After High Temperature Life Test | | | | Remarks |
| | | | | | | Dielectric Loss Factor tan δ(%) | Relative Dielectric Constant εs | Insulation Resistance (GΩ) | Capacitance Change (%) | |
|---|---|---|---|---|---|---|---|---|---|---|
| 201 | 5.4 | 3.24 | 13,900 | 34.0 | 160 | 4.19 | 11,100 | 9.4 | 19.8 | Comparative Example |
| 202 | 5.2 | 2.51 | 10,400 | 37.5 | 180 | 3.10 | 8,500 | 10.2 | 18.2 | Comparative Example |
| 203 | 5.4 | 2.81 | 11,800 | 40.9 | 190 | 3.37 | 9,800 | 11.2 | 16.9 | Comparative Example |
| 204 | 5.4 | 2.78 | 11,000 | 42.8 | 200 | 3.52 | 9,300 | 11.7 | 15.7 | Comparative Example |
| 205 | 5.3 | 3.29 | 11,500 | 44.4 | 210 | 4.09 | 9,900 | 12.2 | 14.3 | Comparative Example |
| 206 | 5.6 | 2.99 | 12,600 | 45.5 | 220 | 3.67 | 11,000 | 12.7 | 11.7 | Comparative |

TABLE 4-continued

| | | | | | | After High Temperature Life Test | | | | |
|---|---|---|---|---|---|---|---|---|---|---|
| Test No. | Ceramic Thickness (μm) | Dielectric Loss tan δ (%) | Relative Dielectric Constant ∈s | Insuration Resistance (GΩ) | Breakdown Voltage (V) | Dielectric Loss Factor tan δ(%) | Relative Dielectric Constant ∈s | Insuration Resistance (GΩ) | Capacitance Change (%) | Remarks |
| 207 | 5.3 | 3.08 | 14,100 | 48.5 | 240 | 3.37 | 12,600 | 13.5 | 10.5 | Example Comparative Example |
| 208 | 5.5 | 3.39 | 12,200 | 45.7 | 210 | 4.36 | 10,700 | 12.6 | 12.5 | Comparative Example |
| 209 | 5.5 | 3.00 | 11,600 | 44.0 | 190 | 3.63 | 9,900 | 12.0 | 14.7 | Comparative Example |

In these results, it is figured out that all of relative dielectric constant ∈s, tanδ and breakdown voltage show adequate values respectively by including the oxide of lanthanide. As compared with the ceramics including Y oxide, the relative dielectric constant is slightly inferior, but the tan∈ is substantially equal. Further the capacitor including the oxide of lanthanide is superior to the capacitor including Y oxide in breakdown voltage, and after high temperature life test, insulation resistance and capacitance change rate resistance also. Specifically, it is apparent that the including of Ho has a remarkable effect.

Example 3

Enhancement of breakdown voltage is effective to enable a dielectric layer to be thinned so that a capacitor can be smaller in size and also larger in capacitance. Thereat, the same composition as sample number 103 including 0.1% by weight of $Al_2O_3$ in example 1 or the same composition as the sample number 108 including 0.1% by weight of $SiO_2$ was applied to a dielectric material and then green sheets to obtain 5 to 22 μm of thickness after sintering were fabricated. With applying the resulting sheet, multi-layer ceramic chip capacitors were fabricated by the same manufacturing conditions and treatment methods as example 1. With respect to these capacitors, relative dielectric constant ∈s at 25° C. dielectric loss factor tanδ and breakdown voltage, were measured.

The thickness of the dielectric material after sintering and measured results of these characteristics are shown in table 5 in all.

that $Al_2O_3$ is included instead of $SiO_2$ (sample number 301 to 305), the dielectric loss factor is small and deterioration of breakdown voltage is also limited. In addition, sufficiently high dielectric constant can be obtained.

Example 4

The effect in oxide of element in 5a group or 6a group in the periodic table was studied. In the main component of the dielectric material, all of x=0.05, y=0.2, and A/B=1.005 (where A+B=1) were the same as example 1. Lanthanide (L) is set up in Ho and α was varied in 0, 0.005 and 0.015. As the subsidiary component, 0.2% by weight of MnO and 0.10% by weight of Al2O3 were used. With adding Ta oxide and/or Mo oxide in the variable amounts shown in table 6, green sheets to obtain 5 μm of thickness after sintering were fabricated. With applying these green sheets, multi-layer ceramic chip capacitors were fabricated in the same process as example 1. After the high temperature life test, relative dielectric constant at 25° C., and capacitance change rate before and after the test were determined. The results are shown in table 7.

In the case of sample number 401 not including lanthanide, short circuit was caused in the high temperature life test. Therefore characteristics of the dielectric material could not be measured. Sample number 402 and 412 include Ho oxide which improves the insulation resistance. However these samples did not include oxide of element in 5a group or 6a group. As compared with these samples, in the cases that oxide of element in 5a group or 6a group is included, it is figured out that dielectric material has better

TABLE 5

| Test No. | Ceramic Composition | Ceramic Thickness (μm) | Dielectric Loss Factor tan δ (%) | Relative Dielectric Constant ∈s | Breakdown Voltage (V) | Remarks |
|---|---|---|---|---|---|---|
| 301 | The Same | 22.3 | 2.54 | 13,000 | 820 | Example |
| 302 | as Test | 15.2 | 2.67 | 13,200 | 610 | " |
| 303 | No. 103 | 10.3 | 2.87 | 13,400 | 430 | " |
| 304 | | 7.3 | 2.98 | 13,700 | 310 | " |
| 305 | | 5.1 | 3.07 | 14,000 | 230 | " |
| 306 | The Same | 22.3 | 2.79 | 13,500 | 810 | Comparative |
| 307 | as Test | 15.3 | 3.12 | 13,700 | 420 | " |
| 308 | No. 108 | 10.5 | 4.03 | 13,700 | 290 | " |
| 309 | | 7.5 | 5.22 | 14,100 | 50 | " |
| 310 | | 5.1 | 6.27 | 13,600 | 30 | " |

As apparent from the test results of sample number 306 to 310, when $SiO_3$ is applied as the subsidiary component, increase of the dielectric constant and deterioration of breakdown voltage are significant in parallel with decrease of the thickness of the dielectric material. By contrast, in the case characteristics as shown in smaller capacitance change rate. When oxide of element in 5a group or 6a group is added, the insulation resistance tends to be smaller, but lowering of the insulation resistance value after the high temperature life test becomes smaller.

In the cases of sample number 419, 423, 425, 426 and 427 in which total content of oxides of elements in 5a group and 6a group is more than 0.4% by weight, the insulation resistance is significantly small.

TABLE 6

| Test No. | L$_2$O$_3$ Compound Species | α | MnO | Al$_2$O$_3$ | 5a Group Element Ta$_2$O$_5$ | 6a Group Element MoO$_3$ | Remarks |
|---|---|---|---|---|---|---|---|
| 401 |  | 0 | 0.20 | 0.10 | 0 | 0 | Comparative Example |
| 402 | Ho$_2$O$_3$ | 0.015 | 0.20 | 0.10 | 0 | 0 | Comparative Example |
| 403 | Ho$_2$O$_3$ | 0.015 | 0.20 | 0.10 | 0 | 0.10 | Comparative Example |
| 404 | Ho$_2$O$_3$ | 0.015 | 0.20 | 0.10 | 0 | 0.20 | Comparative Example |
| 405 | Ho$_2$O$_3$ | 0.015 | 0.20 | 0.10 | 0 | 0.40 | Comparative Example |
| 406 | Ho$_2$O$_3$ | 0.015 | 0.20 | 0.10 | 0.10 | 0 | Comparative Example |
| 407 | Ho$_2$O$_3$ | 0.015 | 0.20 | 0.10 | 0.20 | 0 | Comparative Example |
| 408 | Ho$_2$O$_3$ | 0.015 | 0.20 | 0.10 | 0.40 | 0 | Comparative Example |
| 409 | Ho$_2$O$_3$ | 0.015 | 0.20 | 0.10 | 0.05 | 0.05 | Comparative Example |
| 410 | Ho$_2$O$_3$ | 0.015 | 0.20 | 0.10 | 0.10 | 0.10 | Comparative Example |
| 411 | Ho$_2$O$_3$ | 0.015 | 0.20 | 0.10 | 0.20 | 0.20 | Comparative Example |
| 412 | Ho$_2$O$_3$ | 0.005 | 0.20 | 0.10 | 0 | 0 | Comparative Example |
| 413 | Ho$_2$O$_3$ | 0.005 | 0.20 | 0.10 | 0 | 0.10 | Comparative Example |
| 414 | Ho$_2$O$_3$ | 0.005 | 0.20 | 0.10 | 0 | 0.20 | Comparative Example |
| 415 | Ho$_2$O$_3$ | 0.005 | 0.20 | 0.10 | 0 | 0.40 | Comparative Example |
| 416 | Ho$_2$O$_3$ | 0.005 | 0.20 | 0.10 | 0.10 | 0 | Comparative Example |
| 417 | Ho$_2$O$_3$ | 0.005 | 0.20 | 0.10 | 0.10 | 0.10 | Comparative Example |
| 418 | Ho$_2$O$_3$ | 0.005 | 0.20 | 0.10 | 0.10 | 0.20 | Comparative Example |
| 419 | Ho$_2$O$_3$ | 0.005 | 0.20 | 0.10 | 0.10 | 0.40 | Comparative Example |
| 420 | Ho$_2$O$_3$ | 0.005 | 0.20 | 0.10 | 0.20 | 0 | Comparative Example |
| 421 | Ho$_2$O$_3$ | 0.005 | 0.20 | 0.10 | 0.20 | 0.10 | Comparative Example |
| 422 | Ho$_2$O$_3$ | 0.005 | 0.20 | 0.10 | 0.20 | 0.20 | Comparative Example |
| 423 | Ho$_2$O$_3$ | 0.005 | 0.20 | 0.10 | 0.20 | 0.40 | Comparative Example |
| 424 | Ho$_2$O$_3$ | 0.005 | 0.20 | 0.10 | 0.40 | 0 | Comparative Example |
| 425 | Ho$_2$O$_3$ | 0.005 | 0.20 | 0.10 | 0.40 | 0.10 | Comparative Example |
| 426 | Ho$_2$O$_3$ | 0.005 | 0.20 | 0.10 | 0.40 | 0.20 | Comparative Example |
| 427 | Ho$_2$O$_3$ | 0.005 | 0.20 | 0.10 | 0.40 | 0.40 | Comparative Example |

TABLE 7

| Test No. | Ceramic Thickness (μm) | Dielectric Loss Factor tan δ (%) | Relative Dielectric Constant εs | Insulation Resistance (GΩ) | Breakdown Voltage (V) | After High Temperature Life Test Dielectric Loss Factor tan δ(%) | Relative Dielectric Constant εs | Insulation Resistance (GΩ) | Capacitance Change (%) | Remarks |
|---|---|---|---|---|---|---|---|---|---|---|
| 401 | 5.0 | 3.47 | 13,700 | 59.8 | 150 | — | — | shorted | — | Comparative Example |
| 402 | 4.9 | 3.24 | 13,000 | 21.3 | 210 | 4.17 | 11,900 | 10.1 | 8.7 | Comparative |

TABLE 7-continued

| | Dielectric | | | | | After High Temperature Life Test | | | | |
|---|---|---|---|---|---|---|---|---|---|---|
| Test No. | Ceramic Thickness (μm) | Loss Factor tan δ (%) | Relative Dielectric Constant εs | Insuration Resistance (GΩ) | Breakdown Voltage (V) | Dielectric Loss Factor tan δ(%) | Relative Dielectric Constant εs | Insuration Resistance (GΩ) | Capacitance Change (%) | Remarks |
| 403 | 4.7 | 3.37 | 12,100 | 14.7 | 220 | 4.16 | 11,500 | 9.8 | 4.6 | Example Comparative Example |
| 404 | 5.1 | 3.02 | 11,000 | 12.8 | 190 | 4.03 | 11,100 | 9.2 | 4.2 | Comparative Example |
| 405 | 5.0 | 3.06 | 10,300 | 7.9 | 200 | 4.05 | 9,900 | 5.7 | 3.9 | Comparative Example |
| 406 | 5.1 | 3.40 | 12,000 | 14.5 | 220 | 4.18 | 11,500 | 9.9 | 4.4 | Comparative Example |
| 407 | 5.0 | 2.92 | 11,500 | 12.3 | 200 | 4.06 | 11,000 | 8.7 | 4.0 | Comparative Example |
| 408 | 5.1 | 3.17 | 10,300 | 7.8 | 190 | 4.15 | 9,900 | 5.7 | 3.8 | Comparative Example |
| 409 | 4.9 | 3.34 | 12,000 | 15.2 | 200 | 4.01 | 11,600 | 10.2 | 3.3 | Comparative Example |
| 410 | 4.9 | 3.02 | 11,600 | 13.5 | 200 | 4.15 | 11,200 | 9.8 | 3.1 | Comparative Example |
| 411 | 5.2 | 3.31 | 10,700 | 11.1 | 200 | 4.10 | 10,400 | 7.8 | 2.6 | Comparative Example |
| 412 | 4.7 | 3.19 | 14,200 | 47.6 | 270 | 4.00 | 12,800 | 22.8 | 10.1 | Comparative Example |
| 413 | 5.0 | 3.44 | 13,600 | 34.3 | 280 | 4.17 | 12,900 | 23.3 | 4.9 | Comparative Example |
| 414 | 5.0 | 3.07 | 13,600 | 23.6 | 250 | 4.10 | 13,000 | 16.5 | 4.4 | Comparative Example |
| 415 | 4.9 | 3.17 | 11,300 | 11.6 | 200 | 4.02 | 10,800 | 8.5 | 4.0 | Comparative Example |
| 416 | 5.2 | 3.11 | 13,500 | 34.0 | 270 | 4.04 | 12,900 | 22.9 | 4.6 | Comparative Example |
| 417 | 5.1 | 3.27 | 12,800 | 27.1 | 260 | 4.17 | 12,400 | 19.0 | 3.2 | Comparative Example |
| 418 | 4.9 | 3.22 | 12,900 | 20.0 | 240 | 4.19 | 12,500 | 14.6 | 3.0 | Comparative Example |
| 419 | 5.0 | 3.11 | 10,800 | 10.1 | 190 | 4.08 | 10,500 | 7.3 | 2.8 | Comparative Example |
| 420 | 5.0 | 3.12 | 13,700 | 24.3 | 260 | 4.01 | 13,100 | 17.3 | 4.3 | Comparative Example |
| 421 | 4.7 | 2.93 | 12,900 | 20.4 | 240 | 4.05 | 12,500 | 14.9 | 3.0 | Comparative Example |
| 422 | 4.9 | 2.97 | 12,000 | 15.6 | 210 | 4.13 | 11,700 | 11.5 | 2.9 | Comparative Example |
| 423 | 5.0 | 3.06 | 10,600 | 9.3 | 190 | 4.11 | 10,300 | 6.8 | 2.7 | Comparative Example |
| 424 | 5.1 | 2.98 | 11,300 | 11.9 | 190 | 4.05 | 10,900 | 8.6 | 3.9 | Comparative Example |
| 425 | 4.8 | 3.09 | 11,100 | 10.8 | 190 | 4.04 | 10,600 | 7.9 | 2.8 | Comparative Example |
| 426 | 4.9 | 2.91 | 10,600 | 9.3 | 190 | 4.01 | 10,300 | 6.8 | 2.7 | Comparative Example |
| 427 | 5.1 | 3.40 | 9,800 | 6.3 | 190 | 4.10 | 9,500 | 4.7 | 2.6 | Comparative Example |

Example 5

The effect in combined addition of oxides of elements in 5a group and 6a group within a subsidiary component was examined. In the main component of the dielectric material, x=0.05, y=0.2, and A/B=1.005 were the same as example 1. Ho is selected for L and α was varied in 0.002 and 0.004. For a sintering auxiliary of the subsidiary component, 0.2% by weight of MnO and 0.10% by weight of $Al_2O_3$ were included in constant respectively. With applying $V_2O_5$, $Nb_2O_5$ and/or $Ta_2O_5$ as 5a group element oxide and $MoO_3$ and/or $WO_3$ as 6a group element oxide, the content was varied as shown in table 8 to fabricate green sheets. Then multi-layer capacitors were fabricated by the same method as example 1. As with example 4, after the high temperature life test applying, relative dielectric constant at 25° C., dielectric loss factor tanδ, insulation resistance, and capacitance change rate were determined. The results are shown in table 9.

With respect to oxide in subsidiary component, sample number 501 or 516 includes neither 5a group element oxide nor 6a group element oxide. Sample number 504 to 506, 508 to 510, 519 to 521 or 523 to 525 includes both 5a group element oxide and 6a group element oxide. The other sample number includes either 5a group element oxide or 6a group element oxide. In comparing results of these three cases, it is apparent that the capacitance change rate after the test is significantly reduced. Further, when the content is the same, it is figured out that the case including both 5a group element oxide and 6a group element oxide has more effect than the case including one of them.

TABLE 8

| Test No. | L₂O₃ Compound Species | α | MnO | Al₂O₃ | 5a Group Element V₂O₅ | Nb₂O₃ | Ta₂O₅ | 6a Group Element MoO₃ | WO₃ | Remarks |
|---|---|---|---|---|---|---|---|---|---|---|
| 501 | Ho₂O₃ | 0.004 | 0.20 | 0.10 | 0 | 0 | 0 | 0 | 0 | Example |
| 502 | Ho₂O₃ | 0.004 | 0.20 | 0.10 | 0 | 0 | 0 | 0 | 0.10 | " |
| 503 | Ho₂O₃ | 0.004 | 0.20 | 0.10 | 0 | 0 | 0 | 0.05 | 0.05 | " |
| 504 | Ho₂O₃ | 0.004 | 0.20 | 0.10 | 0 | 0 | 0.05 | 0 | 0.05 | " |
| 505 | Ho₂O₃ | 0.004 | 0.20 | 0.10 | 0 | 0.05 | 0 | 0 | 0.05 | " |
| 506 | Ho₂O₃ | 0.004 | 0.20 | 0.10 | 0.05 | 0 | 0 | 0 | 0.05 | " |
| 507 | Ho₂O₃ | 0.004 | 0.20 | 0.10 | 0 | 0 | 0 | 0.10 | 0 | " |
| 508 | Ho₂O₃ | 0.004 | 0.20 | 0.10 | 0 | 0 | 0.05 | 0.05 | 0 | " |
| 509 | Ho₂O₃ | 0.004 | 0.20 | 0.10 | 0 | 0.05 | 0 | 0.05 | 0 | " |
| 510 | Ho₂O₃ | 0.004 | 0.20 | 0.10 | 0.05 | 0 | 0 | 0.05 | 0 | " |
| 511 | Ho₂O₃ | 0.004 | 0.20 | 0.10 | 0 | 0 | 0.10 | 0 | 0 | " |
| 512 | Ho₂O₃ | 0.004 | 0.20 | 0.10 | 0 | 0.05 | 0.05 | 0 | 0 | " |
| 513 | Ho₂O₃ | 0.004 | 0.20 | 0.10 | 0.05 | 0 | 0.05 | 0 | 0 | " |
| 514 | Ho₂O₃ | 0.004 | 0.20 | 0.10 | 0 | 0.10 | 0 | 0 | 0 | " |
| 515 | Ho₂O₃ | 0.004 | 0.20 | 0.10 | 0.05 | 0.05 | 0 | 0 | 0 | " |
| 516 | Ho₂O₃ | 0.002 | 0.20 | 0.10 | 0 | 0 | 0 | 0 | 0 | " |
| 517 | Ho₂O₃ | 0.002 | 0.20 | 0.10 | 0 | 0 | 0 | 0 | 0.20 | " |
| 518 | Ho₂O₃ | 0.002 | 0.20 | 0.10 | 0 | 0 | 0 | 0.10 | 0.10 | " |
| 519 | Ho₂O₃ | 0.002 | 0.20 | 0.10 | 0 | 0 | 0.10 | 0 | 0.10 | " |
| 520 | Ho₂O₃ | 0.002 | 0.20 | 0.10 | 0 | 0.10 | 0 | 0 | 0.10 | " |
| 521 | Ho₂O₃ | 0.002 | 0.20 | 0.10 | 0.10 | 0 | 0 | 0 | 0.10 | " |
| 522 | Ho₂O₃ | 0.002 | 0.20 | 0.10 | 0 | 0 | 0 | 0.20 | 0 | " |
| 523 | Ho₂O₃ | 0.002 | 0.20 | 0.10 | 0 | 0 | 0.10 | 0.10 | 0 | " |
| 524 | Ho₂O₃ | 0.002 | 0.20 | 0.10 | 0 | 0.10 | 0 | 0.10 | 0 | " |
| 525 | Ho₂O₃ | 0.002 | 0.20 | 0.10 | 0.10 | 0 | 0 | 0.10 | 0 | " |
| 526 | Ho₂O₃ | 0.002 | 0.20 | 0.10 | 0 | 0 | 0.20 | 0 | 0 | " |
| 527 | Ho₂O₃ | 0.002 | 0.20 | 0.10 | 0 | 0.10 | 0.10 | 0 | 0 | " |
| 528 | Ho₂O₃ | 0.002 | 0.20 | 0.10 | 0.10 | 0 | 0.10 | 0 | 0 | " |
| 529 | Ho₂O₃ | 0.002 | 0.20 | 0.10 | 0 | 0.20 | 0 | 0 | 0 | " |
| 530 | Ho₂O₃ | 0.002 | 0.20 | 0.10 | 0.10 | 0.10 | 0 | 0 | 0 | " |

TABLE 9

| Test No. | Dielectric Ceramic Thickness (μm) | Loss Factor tan δ (%) | Relative Dielectric Constant εs | Insulation Resistance (GΩ) | Breakdown Voltage (V) | After High Temperature Life Test Dielectric Loss Factor tan δ(%) | Relative Dielectric Constant εs | Insulation Resistance (GΩ) | Capacitance Change (%) | Remarks |
|---|---|---|---|---|---|---|---|---|---|---|
| 501 | 4.8 | 2.93 | 13,800 | 48.4 | 230 | 4.09 | 12,400 | 22.7 | 10.5 | Example |
| 502 | 4.9 | 3.30 | 14,000 | 35.3 | 240 | 4.05 | 13,300 | 23.8 | 5.1 | " |
| 503 | 4.8 | 3.04 | 14,100 | 35.1 | 220 | 4.20 | 13,400 | 23.8 | 4.8 | " |
| 504 | 4.8 | 3.33 | 14,000 | 36.0 | 240 | 4.18 | 13,500 | 24.3 | 3.6 | " |
| 505 | 4.9 | 2.99 | 13,900 | 36.5 | 220 | 4.04 | 13,400 | 24.2 | 3.6 | " |
| 506 | 4.5 | 2.96 | 14,100 | 35.9 | 230 | 4.03 | 13,600 | 24.1 | 3.4 | " |
| 507 | 4.8 | 3.20 | 14,000 | 35.2 | 230 | 4.02 | 13,300 | 23.9 | 5.3 | " |
| 508 | 4.7 | 2.93 | 14,000 | 36.4 | 240 | 4.05 | 13,500 | 24.4 | 3.5 | " |
| 509 | 4.6 | 2.96 | 14,100 | 35.8 | 220 | 4.10 | 13,600 | 24.0 | 3.3 | " |
| 510 | 4.7 | 3.14 | 14,200 | 35.8 | 220 | 4.09 | 13,700 | 24.2 | 3.8 | " |
| 511 | 4.7 | 3.15 | 13,900 | 34.7 | 210 | 4.14 | 13,300 | 23.2 | 4.5 | " |
| 512 | 4.8 | 3.14 | 14,000 | 35.1 | 210 | 4.19 | 13,300 | 23.5 | 4.9 | " |
| 513 | 4.7 | 3.41 | 14,100 | 35.2 | 220 | 4.17 | 13,400 | 23.4 | 4.7 | " |
| 514 | 4.6 | 3.21 | 14,000 | 35.0 | 220 | 4.11 | 13,300 | 23.2 | 4.8 | " |
| 515 | 4.6 | 2.98 | 14,000 | 35.3 | 230 | 4.16 | 13,300 | 23.4 | 5.0 | " |
| 516 | 4.9 | 3.13 | 13,700 | 49.9 | 240 | 4.12 | 12,200 | 23.9 | 10.8 | " |
| 517 | 4.7 | 3.33 | 13,200 | 25.0 | 190 | 4.02 | 12,600 | 17.4 | 4.5 | " |
| 518 | 4.7 | 3.07 | 13,100 | 24.5 | 190 | 4.04 | 12,500 | 17.0 | 4.5 | " |
| 519 | 5.0 | 3.38 | 13,500 | 27.9 | 200 | 4.20 | 13,000 | 19.5 | 3.4 | " |
| 520 | 4.7 | 3.45 | 13,400 | 27.4 | 200 | 4.17 | 13,000 | 19.6 | 3.2 | " |
| 521 | 4.6 | 3.35 | 13,500 | 28.1 | 200 | 4.04 | 13,000 | 19.5 | 3.4 | " |
| 522 | 4.9 | 3.02 | 13,100 | 24.3 | 200 | 4.09 | 12,500 | 17.3 | 4.9 | " |

TABLE 9-continued

| | Dielectric | | | | | After High Temperature Life Test | | | | |
|---|---|---|---|---|---|---|---|---|---|---|
| Test No. | Ceramic Thickness (μm) | Loss Factor tan δ (%) | Relative Dielectric Constant εs | Insuration Resistance (GΩ) | Breakdown Voltage (V) | Dielectric Loss Factor tan δ(%) | Relative Dielectric Constant εs | Insuration Resistance (GΩ) | Capacitance Change (%) | Remarks |
| 523 | 4.7 | 3.05 | 13,500 | 27.9 | 220 | 4.13 | 13,100 | 19.5 | 3.3 | " |
| 524 | 4.9 | 3.37 | 13,500 | 27.9 | 190 | 4.12 | 13,100 | 19.5 | 3.1 | " |
| 525 | 4.9 | 2.90 | 13,400 | 27.6 | 200 | 4.04 | 13,000 | 19.6 | 3.2 | " |
| 526 | 4.6 | 3.33 | 13,100 | 24.4 | 190 | 4.12 | 12,500 | 17.3 | 4.6 | " |
| 527 | 4.8 | 2.96 | 13,000 | 24.2 | 190 | 4.05 | 12,400 | 17.3 | 4.5 | " |
| 528 | 4.9 | 3.31 | 13,100 | 24.8 | 210 | 4.11 | 12,500 | 17.1 | 4.6 | " |
| 529 | 4.7 | 3.30 | 13,200 | 24.5 | 200 | 4.15 | 12,600 | 17.4 | 4.7 | " |
| 530 | 4.9 | 2.99 | 13,100 | 24.9 | 190 | 4.08 | 12,500 | 17.8 | 4.6 | " |

Example 6

In the case that 5a group element oxide or 6a group element oxide was included within a subsidiary component, each effect of rare earth elements corresponding to $L_2O_3$ as the main component was compared. The main component of dielectric material was set up in the same as example 1 except the setting of α or $L_2O_3$. Then, as the composition shown in table 10, $Y_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$ or $Yb_2O_3$ was applied as $L_2O_3$ and α was set up constant at 0 or 0.003. Vanadium oxide and/or W oxide were selected respectively as 5a group element oxide or 6a group element oxide. Then, their total content was set up in constant 0.10% by weight. Then multi-layer ceramic chip capacitors were fabricated by the same method as example 1. After the high temperature life test applying, relative dielectric constant at 25° C., dielectric loss factor tanδ, insulation resistance, and capacitance change rate were determined. The results are shown in table 11.

TABLE 10

| | Oxide of Sub Component (weight %) | | | | | | |
|---|---|---|---|---|---|---|---|
| | $L_2O_3$ Compound | | | | 5a Group Element | 6a Group Element | |
| Test No. | Species | α | MnO | $Al_2O_3$ | $V_2O_5$ | $WO_3$ | Remarks |
| 601 | — | — | 0.20 | 0.10 | 0 | 0 | Comparative |
| 602 | $Y_2O_3$ | 0.003 | 0.20 | 0.10 | 0 | 0.10 | " |
| 603 | $Y_2O_3$ | 0.003 | 0.20 | 0.10 | 0.05 | 0.05 | " |
| 604 | $Y_2O_3$ | 0.003 | 0.20 | 0.10 | 0.10 | 0 | " |
| 605 | $Nd_2O_3$ | 0.003 | 0.20 | 0.10 | 0 | 0.10 | Example |
| 606 | $Nd_2O_3$ | 0.003 | 0.20 | 0.10 | 0.05 | 0.05 | " |
| 607 | $Nd_2O_3$ | 0.003 | 0.20 | 0.10 | 0.10 | 0 | " |
| 608 | $Sm_2O_3$ | 0.003 | 0.20 | 0.10 | 0 | 0.10 | " |
| 609 | $Sm_2O_3$ | 0.003 | 0.20 | 0.10 | 0.05 | 0.05 | " |
| 610 | $Sm_2O_3$ | 0.003 | 0.20 | 0.10 | 0.10 | 0 | " |
| 611 | $Eu_2O_3$ | 0.003 | 0.20 | 0.10 | 0 | 0.10 | " |
| 612 | $Eu_2O_3$ | 0.003 | 0.20 | 0.10 | 0.05 | 0.05 | " |
| 613 | $Eu_2O_3$ | 0.003 | 0.20 | 0.10 | 0.10 | 0 | " |
| 614 | $Gd_2O_3$ | 0.003 | 0.20 | 0.10 | 0 | 0.10 | " |
| 615 | $Gd_2O_3$ | 0.003 | 0.20 | 0.10 | 0.05 | 0.05 | " |
| 616 | $Gd_2O_3$ | 0.003 | 0.20 | 0.10 | 0.10 | 0 | " |
| 617 | $Tb_2O_3$ | 0.003 | 0.20 | 0.10 | 0 | 0.10 | " |
| 618 | $Tb_2O_3$ | 0.003 | 0.20 | 0.10 | 0.05 | 0.05 | " |
| 619 | $Tb_2O_3$ | 0.003 | 0.20 | 0.10 | 0.10 | 0 | " |
| 620 | $Dy_2O_3$ | 0.003 | 0.20 | 0.10 | 0 | 0.10 | " |
| 621 | $Dy_2O_3$ | 0.003 | 0.20 | 0.10 | 0.05 | 0.05 | " |
| 622 | $Dy_2O_3$ | 0.003 | 0.20 | 0.10 | 0.10 | 0 | " |
| 623 | $Ho_2O_3$ | 0.003 | 0.20 | 0.10 | 0 | 0.10 | " |
| 624 | $Ho_2O_3$ | 0.003 | 0.20 | 0.10 | 0.05 | 0.05 | " |
| 625 | $Ho_2O_3$ | 0.003 | 0.20 | 0.10 | 0.10 | 0 | " |
| 626 | $Er_2O_3$ | 0.003 | 0.20 | 0.10 | 0 | 0.10 | " |
| 627 | $Er_2O_3$ | 0.003 | 0.20 | 0.10 | 0.05 | 0.05 | " |
| 628 | $Er_2O_3$ | 0.003 | 0.20 | 0.10 | 0.10 | 0 | " |
| 629 | $Yb_2O_3$ | 0.003 | 0.20 | 0.10 | 0 | 0.10 | " |
| 630 | $Yb_2O_3$ | 0.003 | 0.20 | 0.10 | 0.05 | 0.05 | " |
| 631 | $Yb_2O_3$ | 0.003 | 0.20 | 0.10 | 0.10 | 0 | " |

TABLE 11

| Test No. | Dielectric | | | | | After High Temperature Life Test | | | | Remarks |
|---|---|---|---|---|---|---|---|---|---|---|
| | Ceramic Thickness ($\mu$m) | Loss Factor tan $\delta$ (%) | Relative Dielectric Constant $\epsilon$s | Insuration Resistance (G$\Omega$) | Breakdown Voltage (V) | Dielectric Loss Factor tan $\delta$(%) | Relative Dielectric Constant $\epsilon$s | Insuration Resistance (G$\Omega$) | Capacitance Change (%) | |
| 601 | 5.0 | 3.22 | 13,500 | 55.6 | 150 | — | — | shorted | — | Comparative |
| 602 | 4.8 | 3.29 | 13,400 | 27.3 | 140 | 4.16 | 11,400 | 8.6 | 14.7 | " |
| 603 | 5.0 | 3.13 | 13,600 | 29.0 | 160 | 4.07 | 11,800 | 11.4 | 13.3 | " |
| 604 | 4.9 | 3.12 | 13,400 | 27.3 | 160 | 4.10 | 11,500 | 10.8 | 14.5 | " |
| 605 | 4.9 | 3.35 | 13,500 | 28.7 | 190 | 4.16 | 11,700 | 12.0 | 13.5 | Example |
| 606 | 4.8 | 3.45 | 13,600 | 29.7 | 200 | 4.19 | 12,000 | 12.4 | 12.1 | " |
| 607 | 5.1 | 3.21 | 13,500 | 27.8 | 170 | 4.17 | 11,700 | 11.8 | 13.2 | " |
| 608 | 5.1 | 3.01 | 13,600 | 29.2 | 190 | 4.15 | 11,900 | 13.1 | 12.2 | " |
| 609 | 5.2 | 2.94 | 13,700 | 30.8 | 200 | 4.04 | 12,200 | 13.7 | 10.8 | " |
| 610 | 5.2 | 3.27 | 13,600 | 29.5 | 210 | 4.19 | 12,000 | 13.2 | 11.9 | " |
| 611 | 5.1 | 3.02 | 13,600 | 29.8 | 190 | 4.14 | 12,100 | 14.4 | 11.0 | " |
| 612 | 4.9 | 3.17 | 13,700 | 31.3 | 200 | 4.10 | 12,400 | 15.1 | 9.6 | " |
| 613 | 5.1 | 3.33 | 13,600 | 29.8 | 200 | 4.12 | 12,100 | 14.3 | 10.9 | " |
| 614 | 5.0 | 2.97 | 13,800 | 31.9 | 200 | 4.07 | 12,600 | 16.3 | 8.6 | " |
| 615 | 4.9 | 3.45 | 13,900 | 33.9 | 220 | 4.15 | 12,900 | 17.7 | 7.2 | " |
| 616 | 4.9 | 3.27 | 13,800 | 31.9 | 230 | 4.01 | 12,700 | 16.6 | 8.3 | " |
| 617 | 5.0 | 2.90 | 13,900 | 33.1 | 210 | 4.01 | 12,900 | 18.6 | 7.4 | " |
| 618 | 4.9 | 3.20 | 13,900 | 34.8 | 210 | 4.06 | 13,200 | 19.3 | 6.1 | " |
| 619 | 5.2 | 3.19 | 13,900 | 33.1 | 220 | 4.14 | 12,900 | 18.5 | 7.2 | " |
| 620 | 5.2 | 3.05 | 13,900 | 34.1 | 230 | 4.12 | 13,000 | 21.0 | 6.4 | " |
| 621 | 5.2 | 3.33 | 14,000 | 35.4 | 240 | 4.08 | 13,300 | 21.6 | 4.9 | " |
| 622 | 5.0 | 3.13 | 13,900 | 34.2 | 240 | 4.17 | 13,100 | 21.1 | 6.0 | " |
| 623 | 5.0 | 3.07 | 14,000 | 35.5 | 260 | 4.15 | 13,300 | 23.9 | 5.1 | " |
| 624 | 5.3 | 2.92 | 14,000 | 36.4 | 260 | 4.09 | 13,500 | 24.4 | 3.7 | " |
| 625 | 4.8 | 3.29 | 13,900 | 35.0 | 250 | 4.06 | 13,200 | 23.8 | 4.7 | " |
| 626 | 4.8 | 3.13 | 13,800 | 32.7 | 220 | 4.05 | 12,700 | 19.8 | 8.0 | " |
| 627 | 4.9 | 3.05 | 13,900 | 34.4 | 250 | 4.02 | 13,000 | 21.3 | 6.6 | " |
| 628 | 5.0 | 2.97 | 13,800 | 32.5 | 240 | 4.09 | 12,700 | 19.7 | 7.9 | " |
| 629 | 5.1 | 3.24 | 13,700 | 30.2 | 210 | 4.03 | 12,200 | 16.9 | 11.2 | " |
| 630 | 5.3 | 3.02 | 13,700 | 31.2 | 230 | 4.13 | 12,400 | 17.4 | 9.7 | " |
| 631 | 5.1 | 3.42 | 13,600 | 30.0 | 210 | 4.11 | 12,100 | 16.7 | 10.7 | " |

Since $L_2O_3$ of sample number 602 to 604 is $Y_2O_3$, it is out of the scope of the present invention. However, by means of making 5a group element oxide or 6a group element oxide to be included into its subsidiary component, capacitors having excellent dielectric characteristics were provided. In contrast, in the case that lanthanide is applied, the dielectric material having equal or better performance as compared with that applying Y can be obtained. That is, in the case of Nd of atomic number 60 having characteristics equal to or slightly better than that of Y, as the atomic number of element is increased more, the insulation resistance becomes higher so that the insulation resistance and the capacitance change rate in high temperature life test may be significantly improved. Specifically, the elements of atomic number 64 to 68 show the best effect. Particularly, with including Ho of atomic number 67, the insulation resistance becomes about 2 times as large as Y including in the maximum value and also the capacitance change rate is ⅓ of Y including in the minimum value.

A ceramic dielectric material according to the present invention has high breakdown voltage, high dielectric constant and small dielectric loss factor. Therefore, when a multi-layer ceramic chip capacitor is manufactured with applying this dielectric material, the layers of the material can be thinned so that the capacitor can be small in size with high performance and large capacitance. Further, since low cost base metal can be applied to the internal electrode of this capacitor, its cost performance can be improved. In addition, since this capacitor has less deterioration of insulation resistance and smaller capacitance change rate in high temperature life test, high reliability can be achieved.

Although this invention has described with respect to some preferred embodiments thereof, it is to be understood that the invention is not limited to said embodiments and various changes and modifications may be made without departing from the spirit and scope of the invention.

What is claimed is:

1. A ceramic dielectric material comprising:
    a main component represented by the following composition formula (a), and a subsidiary component including
    0.01 to 1.0% by weight of MnO, and
    0.005 to 0.5% by weight of an oxide containing $Al_2O_3$ as a major component;

$$(1-\alpha)\{(Ba_{1-x}Ca_xO)_A (Ti_{1-y}Zr_{y/2}O_2)_B\}\cdot\alpha L_2O_3 \quad (a)$$

wherein
    $0.0005 \leq \alpha \leq 0.015$
    $0.03 \leq x \leq 0.15$
    $0.01 \leq y \leq 0.25$
    $1.00 \leq A/B \leq 1.02$
    L: at least one element selected from lanthanide elements.

2. A ceramic dielectric material as defined in claim 1, the oxide represented by $L_2O_3$ is an oxide of Ho or an oxide of lanthanide containing Ho as a main component.

3. A ceramic dielectric material comprising:
    a main component represented by the following composition formula (a), and a subsidiary component including
    0.01 to 1.0% by weight of MnO,
    0.005 to 0.5% by weight of an oxide containing $Al_2O_3$ as a major component and
    0.01 to 0.4 total % by weight of at least one oxide selected from the group consisting of V oxides, Nb oxides, Ta oxides, Mo oxides and W oxides;

$$(1-\alpha)\{(Ba_{1-x}Ca_xO)_A(Ti_{1-y}Zr_yO_2)_B\}\cdot\alpha L_2O_3 \quad (a)$$

wherein
$0.0005 \leq \alpha \leq 0.015$
$0.03 \leq x \leq 0.15$
$0.01 \leq y \leq 0.25$
$1.00 \leq A/B \leq 1.02$ L: at least one element selected from lanthanide elements.

4. A ceramic dielectric material according to claim 3, containing collectively in the subsidiary component; more than 0.01% by weight of at least one oxide selected from the group consisting of V oxides, Nb oxides and Ta oxides, and equal to or more than 0.01% by weight of Mo oxides and/or W oxides.

5. A ceramic dielectric material according to claim 3, wherein the oxide represented by $L_2O_3$ is an oxide of Ho or an oxide of lanthanide mainly including Ho.

6. A ceramic dielectric material according to claim 3, containing collectively in the subsidiary component; more than 0.01% by weight of at least one oxide selected from the group consisting of V oxides, Nb oxides and Ta oxides, and equal to or more than 0.01% by weight of Mo oxides and/or W oxides, and the oxide represented by $L_2O_3$ being an oxide of Ho or an oxide of lanthanide mainly including Ho.

7. A multi-layer ceramic chip capacitor comprising: a dielectric material according to claim 1, 2, 3, 4, 5 or 6, and an internal electrode mainly composed of Ni or Ni alloy, wherein said capacitor is made by laminating said dielectric material and said internal electrode and then sintering them.

8. A multi-layer ceramic chip capacitor according to claim 7, wherein thickness of the ceramic dielectric material layer between opposed internal electrodes is equal to or less than 7 μm.

* * * * *